United States Patent [19]
Omata et al.

[11] Patent Number: 5,494,563
[45] Date of Patent: Feb. 27, 1996

[54] METHOD OF MAKING A MAGNETIC CORE OF A MAGNETIC THIN FILM HEAD

[75] Inventors: Yuuji Omata, Toyonaka; Tatsuo Mifune, Hirakata, both of Japan

[73] Assignee: Matsushita Electric Industrial Co., Ltd., Japan

[21] Appl. No.: 215,394

[22] Filed: Mar. 21, 1994

Related U.S. Application Data

[62] Division of Ser. No. 34,366, Mar. 19, 1993, abandoned.

[30] Foreign Application Priority Data

Mar. 19, 1992 [JP] Japan .................................. 4-062994

[51] Int. Cl.$^6$ .............................. C25D 5/10; C25D 5/18
[52] U.S. Cl. ...................... 205/103; 205/119; 205/176
[58] Field of Search .................... 205/103, 119, 205/176, 922

[56] References Cited

U.S. PATENT DOCUMENTS

| | | | |
|---|---|---|---|
| 2,451,341 | 10/1948 | Jernstedt | 205/103 |
| 3,152,974 | 10/1964 | Zentner | 205/103 |
| 3,350,180 | 10/1967 | Croll | 428/635 |
| 3,639,699 | 2/1972 | Tiemann | 360/126 |
| 3,802,854 | 4/1974 | Mueller-Dittmann et al. | 428/686 |
| 4,208,254 | 6/1980 | Mitsumoto et al. | 205/101 |
| 4,900,650 | 2/1990 | Das | 430/319 |
| 4,991,046 | 2/1991 | Adamson et al. | 360/122 |
| 5,032,945 | 7/1991 | Argylle et al. | 360/126 |

OTHER PUBLICATIONS

Tai–Ping Sun et al, Plating with Pulsed and Periodic–Reverse Current, *Metal Finishing*, May, 1979, pp. 33–38.

George W. Jernstedt, Better Deposits at Greater Speeds by PR Plating, *Plating*, Jul., 1948.

Romankiw et al., ECG Extended Abstract No. 300, pp. 430–431 180th Electrochemical Soc. Meeting (1989).

*Primary Examiner*—John Niebling
*Assistant Examiner*—William T. Leader
*Attorney, Agent, or Firm*—Wenderoth, Lind & Ponack

[57] ABSTRACT

A magnetic thin film head having a laminated structure includes a non-magnetic substrate, a lower magnetic layer deposited on the non-magnetic substrate, a magnetic gap layer overlying the lower magnetic layer, at least two insulating layers overlying the magnetic gap layer, at least one electrically conductive layer interposed between the insulating layers, and an upper magnetic layer overlying the insulating layers. A magnetic core of the magnetic thin film head is made up of the upper and lower magnetic layers, at least one of which includes a plurality of magnetically soft layers plated with a metal alloy and a plurality of modified layers each interposed between two adjoining magnetically soft layers. The modified layers function to magnetostatically separate the magnetically soft layers. Each of the modified layers is made by introducing, during electroplating, an anodic dissolution process wherein a surface to be plated is temporarily used as an anode.

2 Claims, 3 Drawing Sheets

METHOD OF MAKING A MAGNETIC CORE OF A MAGNETIC THIN FILM HEAD

This application is a Divisional of now abandoned application, Ser. No. 08/034,366, filed Mar. 19, 1993, now abandoned.

BACKGROUND OF THE INVENTION

1. Field of the Invention

The present invention relates to a method of making a core of a magnetic thin film head suited for high-density magnetic recording.

2. Description of the Prior Art

A magnetic thin film core of a high-density magnetic recording thin film head for use in, for example, a hard disk drive is generally made up of magnetically soft layers. Because the direction of a magnetic path during operations of the head is determined, uniaxial magnetic anisotropy is generally induced in the magnetically soft layers so that an axis of easy magnetization may be directed so as to be perpendicular to the direction of the magnetic path. By doing so, an axis of hard magnetization is directed in parallel with the direction of the magnetic path, and hence, the magnetic core acts as a core having an initial permeability showing superior high-frequency characteristics.

In this case, the magnetic domain structure is generally such that 180° magnetic domain walls are arrayed generally perpendicular to the direction of the magnetic path by inducing the uniaxial magnetic anisotropy in the magnetic core material. However, because the magnitude of the head output or that of noises greatly depends upon the stability of the magnetic domain structure within the core or the pattern of magnetic domains, how to control the magnetic domain structure within the magnetic core is especially important in laminating magnetic core films. Conventionally, a method of controlling magnetic domains of a magnetic thin film core made up of magnetically soft layers has been proposed wherein an even number of magnetically soft layers are laminated one upon another with a very thin non-magnetic insulating layer interposed between two adjoining magnetically soft layers, thereby causing each magnetic layer to have a single magnetic domain structure. This method provides a stable structure wherein two adjoining layers are magnetostatically coupled while they have respective directions of magnetization opposite to each other.

In applications where a multi-layer structure is composed of the magnetically soft layers together with the non-magnetic insulating layers, for example, in the manufacturing process of generally available magnetic thin film heads, the magnetically soft layers are generally made by a wet process such as, for example, electroplating. In such cases, it is difficult to laminate the non-magnetic insulating layers using the same wet process. Furthermore, a dry process wherein each lamination is carried out outside a plating bath is very complicated and has disadvantages in bonding properties between adjoining layers.

SUMMARY OF THE INVENTION

The present invention has been developed to overcome the above-described disadvantages and is intended to provide a method of making a magnetic thin film head having a multi-layer structure made by the use of an alloy plating method.

Another object of the present invention is to provide a method of making such a magnetic thin film head.

In accomplishing the above and other objects, a magnetic thin film head according to the present invention comprises a non-magnetic substrate, a lower magnetic layer deposited on said non-magnetic substrate, a magnetic gap layer overlying said lower magnetic layer, at least two insulating layers overlying said magnetic gap layer, at least one electrically conductive layer interposed between said insulating layers, and an upper magnetic layer overlying said insulating layers. A magnetic core of the magnetic thin film head is made up of the upper and lower magnetic layers. At least one of the upper and lower magnetic layers includes a plurality of magnetically soft layers plated with a metal alloy and a plurality of modified layers each interposed between two adjoining magnetically soft layers. The modified layers function to magnetostatically separate said magnetically soft layers. Each of said modified layers is made by introducing, during electroplating, an anodic dissolution process wherein the surface to be plated is temporarily used as an anode.

More specifically, the upper or lower magnetic layer is made in the following manner:

(a) depositing a magnetically soft layer on a surface to be electroplated;

(b) anodically dissolving a surface region of said electroplated layer opposite to said surface;

(c) cyclically repeating the steps (a) and (b) a required number.

Ni—Fe, Fe—Co—Ni, Fe—Co—Ni—Cr, or Co—Fe—Cr alloy is preferably employed as the aforementioned metal alloy.

According to the present invention, a plurality of anodic dissolution processes, wherein the surface to be plated is temporarily used as an anode, are introduced in the course of film formation by electroplating. Each modified layer is considered as a region produced as a result of dissolution wherein individual alloy components are dissolved at a rate different from the composition of the plated alloy layer, or a surface region of the plated layer roughened by the dissolution. It cannot be considered that such modified layer obtained by the dissolution has magnetically soft properties in composition or in construction in magnetic and physical respects. Accordingly, two adjoining magnetically soft layers exist under the conditions in which they are magnetostatically separated by the modified layer interposed therebetween.

In magnetostatically separating the magnetically soft layers, it is preferred that the modified layers differ therefrom not only in composition but also in crystalline structure.

Furthermore, the thickness of the modified layers can be changed according to the time period during which the anodic dissolution process is carried out. It is expected that the degree to which the plated layers are magnetostatically separated vary according to the thickness of the modified layers. In addition, the number of the plated layers can be optionally selected by changing the number of introduction of the anodic dissolution processes during electroplating.

On the other hand, as discussed previously, the laminated structure of a plurality of magnetically soft layers can realize the condition in which two adjoining magnetically soft layers are magnetostatically coupled with each other. Under certain circumstances, it is possible to cause each magentic layer to have a single magnetic domain structure. For these reasons, it is conceivable that the magnetic domain structure obtained by the present invention greatly differs at least from that of an alloy plated generally homogeneous conventional magnetically soft layer of a single structure even if the total thickness is the same.

Furthermore, the output or noise of a magnetic thin film head employing a magnetic core made up of such magnetically soft layers differs from that of a conventional one according to the magnetic domain structure determined by the magnitude of induced magnetic anisotropy, the magnetic connection between laminated magnetic layers, stresses, or the like, even if the configuration and thickness of the layers, and the composition of a plated material are the same. Accordingly, the output or noise of the magnetic thin film head can be remarkably improved.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
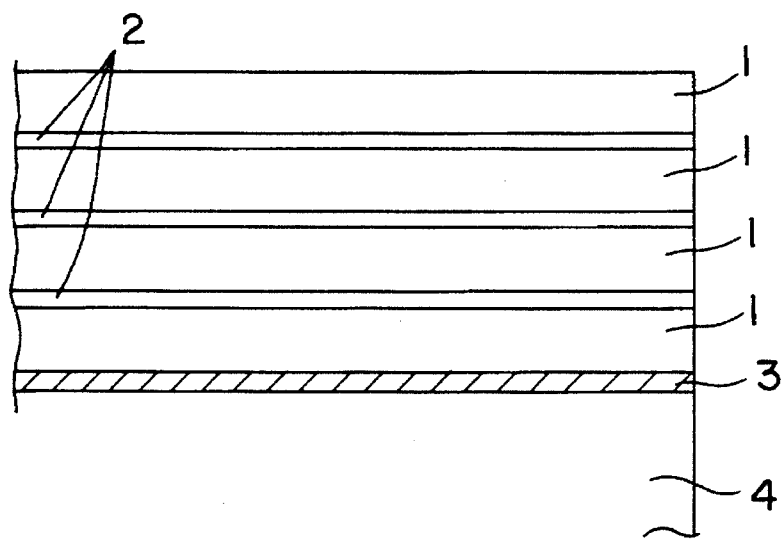
FIG. 1 is a fragmentary sectional view of a magnetic core of a magnetic thin film head according to the present invention.

Referring now to the drawings, there is schematically shown in FIG. 1 a laminated structure of an upper magnetic core segment of a magnetic thin film head embodying the present invention. This structure was made by permalloy (Ni82Fe18) plating. The magnetic core comprises a substrate 4, an electroplated electrode layer 3 overlaid on the substrate 4, four ordinarily plated layers 1 deposited on the electrode layer 3 and each having a thickness of 0.5 μm, and three modified layers 2 each interposed between two adjoining plated layers 1. The four plated layers 1 were formed during constant D.C. electroplating, whereas the three modified layers 2 were formed during anodic dissolution processes, which were carried out three times in the course of the constant D.C. electroplating. Each anodic dissolution process was carried out by temporarily replacing an anode and a cathode used in the constant D.C electroplating with each other. In other words, the substrate 4 together with the electrode layer 3 was temporarily used as the cathode during the electroplating. By doing so, a surface region of each plated layer 1 was gradually dissolved and turned into a modified layer. The modified layer acts as a layer for at least magnetostatically separating the magnetically soft layers positioned on respective sides thereof.

Table 1 shows the bath composition and plating conditions required to make the laminated film structure shown in FIG. 1.

TABLE 1

| BATH COMPOSITION | PLATING CONDITIONS |
| --- | --- |
| $NiSO_4 \cdot 6H_2O$     300 g/l | pH 2.5 |
| $NiCl_2 \cdot 6H_2O$      30 g/l | Temp. 45° C. |
| $FeSO_4 \cdot 7H_2O$      14 g/l | Substrate electrode |
| $H_3BO_3$                 40 g/l | 0.1 μm thick permalloy |
| Sodium saccharate        1.5 g/l | D.C. plated layer: |
| Sodium lauryl sulfate   0.25 g/l | Plating current density |
| | 15 mA/cm$^2$ |
| | Time period for plating |
| | (per one layer) 6 min. |
| | Modified layer: |
| | Plating current density |
| | 4 mA/cm$^2$ |
| | Time period for plating |
| | (per one layer) 1 min. |

Figure 2:
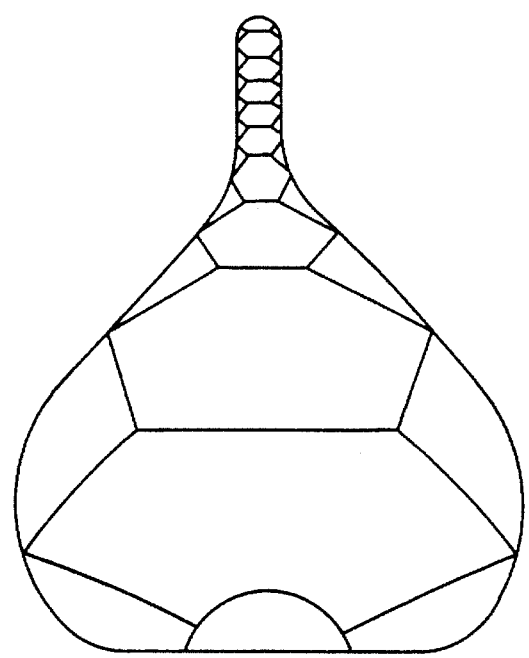
FIG. 2 is a schematic view of a magnetic domain pattern of a permalloy magnetic core according to the present invention.
Figure 3:
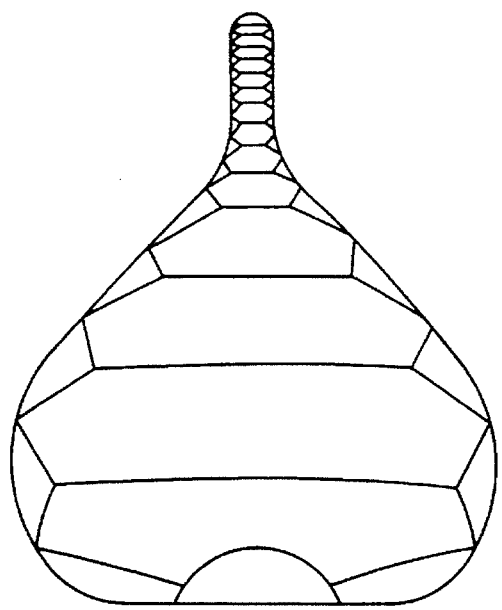
FIG. 3 is a view similar to FIG. 2, but indicating a magnetic domain pattern of a conventional single-layered permalloy magnetic core having the same thickness as the magnetic core of FIG. 2.

FIG. 2 depicts a static magnetic domain structure of the plated core pattern of FIG. 1 observed by the use of Bitter solution technique. For comparison, the domain structure of a conventional core pattern of a single-layer structure is shown in FIG. 3. The conventional core pattern of FIG. 3 has the same total thickness of 2 μm and the same alloy composition as those of the core pattern of FIG. 1.

It can be known from FIGS. 2 and 3 that even if the total thickness of the core pattern and other conditions are the same, it is possible to greatly change the magnetic domain structure by the use of the laminated structure according to the present invention.

Figure 6:
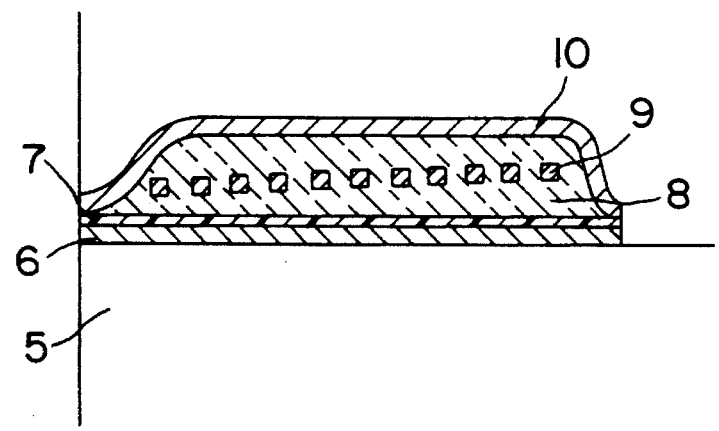
FIG. 6 is a schematic sectional view of a magnetic thin film head according to the present invention.

FIG. 6 depicts an inductive magnetic thin film head employing the electrodeposited core of FIG. 1. This inductive magnetic thin film head comprises a non-magnetic substrate 5, a lower magnetic layer 6 deposited on the substrate 5 to form a lower magnetic core segment, a non-magnetic insulating layer or magnetic gap layer 7 overlaid on the lower magnetic layer 6, at least one electrically conductive layer or coil layer 9 positioned above the magnetic gap layer 7 and sandwiched between insulating layers 8, and an upper magnetic layer 10 overlaid on the insulating layers 8 to form an upper magnetic core segment. When at least one of the upper and lower magnetic layers 6 and 10 was made of alloy-plated magnetically soft layers according to the present invention, the inductive magnetic thin film head showed superior characteristics.

An Fe—Co—Ni magnetic core made by alloy electrodeposition is preferred. Table 2 shows the bath composition and plating conditions required to make an Fe—Co—Ni magnetic core having four laminated layers. During lamination, anodic dissolution processes were carried out three times in the course of the constant D.C. electroplating.

TABLE 2

| BATH COMPOSITION | PLATING CONDITIONS |
| --- | --- |
| $NiSO_4 \cdot 6H_2O$     240 g/l | pH 2.5 |
| $CoSO_4 \cdot 7H_2O$      16 g/l | Temp. 45° C. |
| $FeSO_4 \cdot 7H_2O$      98 g/l | Substrate electrode |
| $H_3BO_3$                 40 g/l | 0.1 μm thick permalloy |
| Sodium saccharate        1.5 g/l | D.C. plated layer: |
| Sodium lauryl sulfate   0.25 g/l | Plating current density |
| | 20 mA/cm$^2$ |
| | Time period for plating |
| | (per one layer) 5 min. |
| | Modified layer: |

TABLE 2-continued

| BATH COMPOSITION | PLATING CONDITIONS |
| --- | --- |
| | Plating current density 6 mA/cm$^2$ |
| | Time period for plating (per one layer) 0.5 min. |

Figure 4:
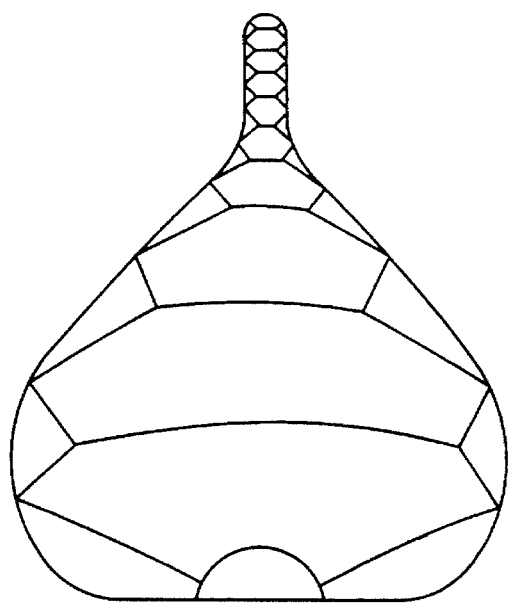
FIG. 4 is a view similar to FIG. 2, but indicating a magnetic domain pattern of an Fe—Co—Ni magnetic core according to the present invention.
Figure 5:
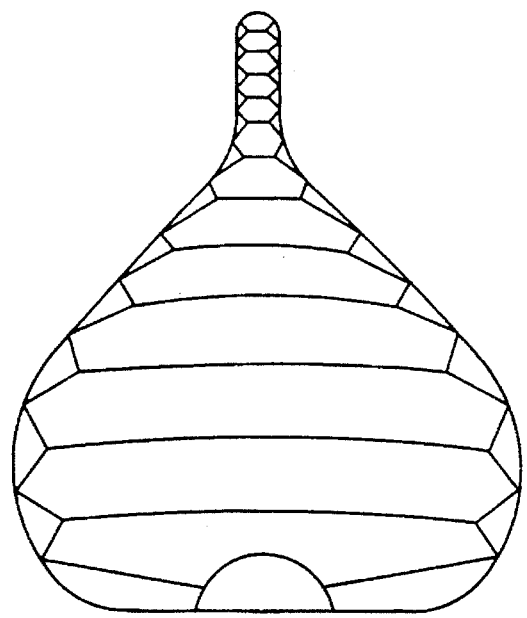
FIG. 5 is a view similar to FIG. 2, but indicating a magentic domain pattern of a conventional single-layered Fe—Co—Ni magnetic core having the same thickness as the magnetic core of FIG. 2.

FIG. 4 depicts a static magnetic domain structure of the plated core pattern observed by the use of Bitter solution technique. For comparison, the domain structure of a conventional core pattern of a single-layer structure is shown in FIG. 5. The conventional core pattern of FIG. 5 has the same total thickness of 2 μm and the same alloy composition as those of the core pattern of FIG. 4.

As is the case with permalloy, it can be known from FIGS. 4 and 5 that even if the total thickness of the core pattern and other conditions are the same, it is possible to greatly change the magnetic domain structure by the use of the laminated structure according to the present invention. When the inductive magnetic thin film head shown in FIG. 6 was made using the Fe—Co—Ni electro-deposit core, the head also showed superior characteristics.

Furthermore, it was confirmed that a thin film head employing Fe—Co—Ni—Cr alloy electro-deposits or Co—Fe—Cr alloy electro-deposits similar to the laminated structure of FIG. 1 achieved substantially the same effects.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. In a method of making a magnetic core segment of a magnetic thin film head which comprises a non-magnetic substrate, a lower magnetic layer deposited on the non-magnetic substrate to form a lower magnetic core segment, a magnetic gap layer overlying the lower magnetic layer, at least two insulating layers overlying the magnetic gap layer, at least one electrically conductive layer interposed between the insulating layers, and an upper magnetic layer overlying the insulating layers to form an upper magnetic core segment, the improvement comprising the steps of:

(a) depositing a magnetically soft layer on a surface to be electroplated, thereby forming an electroplated layer made of a metal alloy;

(b) with said surface temporarily used as an anode anodically dissolving a surface region of said electroplated layer opposite to said surface, thereby forming a modified layer which is different at least in composition from said magnetically soft layer and which is not magnetically soft;

(c) cyclically repeating the steps (a) and (b) a plurality of times to form at least one of said lower and upper magnetic core segments as a multi-layered structure comprising a plurality of magnetically soft layers and a corresponding number of modified layers alternating with each other thereby magnetostatically separating each of said magnetically soft layers.

2. The method according to claim 1, wherein said metal alloy is selected from the group consisting of Ni—Fe, Fe—Co—Ni, Fe—Co—Ni—Cr, and Co—Fe—Cr.

* * * * *